US012664058B2

(12) United States Patent
Woodward et al.

(10) Patent No.: US 12,664,058 B2
(45) Date of Patent: Jun. 23, 2026

(54) MANAGING A QUORUM DEVICE FOR A STORAGE SYSTEM

(71) Applicant: International Business Machines Corporation, Armonk, NY (US)

(72) Inventors: Graham Woodward, Manchester (GB); Anuj Chandra, Bengaluru (IN); Imran Imtiaz, Manchester (GB); Miles Mulholland, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 12 days.

(21) Appl. No.: 18/736,180

(22) Filed: Jun. 6, 2024

(65) Prior Publication Data

US 2025/0355770 A1     Nov. 20, 2025

(30) Foreign Application Priority Data

May 14, 2024    (GB) ..................................... 2406788

(51) Int. Cl.
*G06F 11/14*          (2026.01)
*G06F 11/1446*        (2026.01)
*G06F 21/31*          (2013.01)

(52) U.S. Cl.
CPC ...... *G06F 11/1464* (2013.01); *G06F 11/1469* (2013.01); *G06F 21/31* (2013.01)

(58) Field of Classification Search
CPC .. G06F 11/14; G06F 11/1464; G06F 11/1469; G06F 21/31
See application file for complete search history.

(56) References Cited

U.S. PATENT DOCUMENTS

| | | | | | |
|---|---|---|---|---|---|
| 5,673,384 | A | * | 9/1997 | Hepner ............... | G06F 11/2033 714/E11.134 |
| 7,739,677 | B1 | * | 6/2010 | Kekre ................. | G06F 11/1425 717/121 |
| 7,827,441 | B1 | | 11/2010 | Wenzel | |

(Continued)

FOREIGN PATENT DOCUMENTS

| | | |
|---|---|---|
| CN | 113220218 A | 8/2021 |
| CN | 109074297 B | 9/2022 |

(Continued)

OTHER PUBLICATIONS

Intellectual Property Office, Patents Act 1977: Search Report under Section 17(5), Nov. 15, 2024, 2 Pages, GB Application No. 2406788.6.

(Continued)

*Primary Examiner* — Kamini B Patel
(74) *Attorney, Agent, or Firm* — Seed Intellectual Property Law Group LLP

(57)          ABSTRACT

A scheme for managing a quorum device for a storage system having network of storage controllers of storage clusters is provided. The scheme may include designating a first storage controller as a volume-based quorum device for a second storage controller. The first storage controller is aware of being designated and functions as the volume-based quorum device. The scheme may further include taking snapshots of cluster state metadata at known points, saving the snapshots as quorum volumes, and recovering a storage cluster from the cluster state metadata.

20 Claims, 7 Drawing Sheets

(56)  References Cited

U.S. PATENT DOCUMENTS

| | | | | |
|---|---|---|---|---|
| 7,975,288 | B2 * | 7/2011 | Viavant | G06F 21/40 |
| | | | | 713/172 |
| 8,417,899 | B2 | 4/2013 | Roush | |
| 8,443,231 | B2 | 5/2013 | Abraham et al. | |
| 10,983,880 | B2 | 4/2021 | Gupta et al. | |
| 11,513,899 | B2 | 11/2022 | Caughman et al. | |
| 11,861,221 | B1 | 1/2024 | Richardson et al. | |
| 2007/0261103 | A1 * | 11/2007 | Viavant | G06F 21/40 |
| | | | | 726/2 |
| 2013/0318297 | A1 * | 11/2013 | Jibbe | G06F 3/061 |
| | | | | 711/E12.001 |
| 2014/0108350 | A1 * | 4/2014 | Marsden | G06F 3/0647 |
| | | | | 709/219 |
| 2019/0356609 | A1 * | 11/2019 | Grunwald | G06F 3/0647 |
| 2021/0019093 | A1 * | 1/2021 | Karr | G06F 3/0608 |
| 2022/0075698 | A1 * | 3/2022 | Chen | G06F 11/2033 |
| 2022/0156165 | A1 * | 5/2022 | Grunwald | G06F 3/0611 |
| 2022/0334934 | A1 * | 10/2022 | Tylik | G06F 3/065 |
| 2023/0004464 | A1 | 1/2023 | Karr et al. | |
| 2024/0256391 | A1 * | 8/2024 | Shetty | G06F 3/067 |
| 2025/0044950 | A1 * | 2/2025 | De La Torre | G06F 3/067 |

FOREIGN PATENT DOCUMENTS

| | | |
|---|---|---|
| CN | 117667509 A | 3/2024 |
| GB | 2641055 A | 11/2025 |
| WO | 2023/149887 A1 | 8/2023 |

OTHER PUBLICATIONS

Woodward et al., "Managing a Quorum Device for a Storage System," Application No. 2406788.6, filed May 14, 2024.

* cited by examiner

100

100

HOST ZONE 170

HOST 110     HOST 110     HOST 110     HOST 110

NODE 131

NODE 132

NODE 141

NODE 142

REDUNDANT SAN FABRIC
180

PHYSICAL
STORAGE
SYSTEM 161

PHYSICAL
STORAGE
SYSTEM 163

STORAGE SYSTEM ZONE 190

200

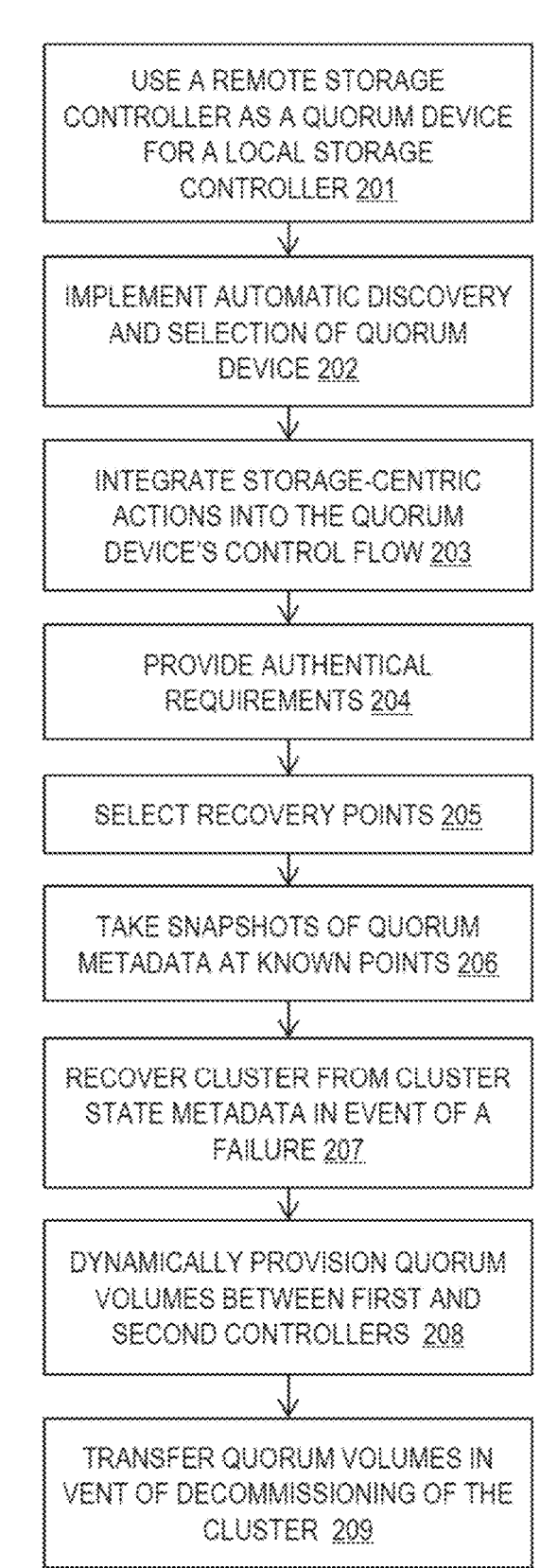

USE A REMOTE STORAGE CONTROLLER AS A QUORUM DEVICE FOR A LOCAL STORAGE CONTROLLER 201

IMPLEMENT AUTOMATIC DISCOVERY AND SELECTION OF QUORUM DEVICE 202

INTEGRATE STORAGE-CENTRIC ACTIONS INTO THE QUORUM DEVICE'S CONTROL FLOW 203

PROVIDE AUTHENTICAL REQUIREMENTS 204

SELECT RECOVERY POINTS 205

TAKE SNAPSHOTS OF QUORUM METADATA AT KNOWN POINTS 206

RECOVER CLUSTER FROM CLUSTER STATE METADATA IN EVENT OF A FAILURE 207

DYNAMICALLY PROVISION QUORUM VOLUMES BETWEEN FIRST AND SECOND CONTROLLERS 208

TRANSFER QUORUM VOLUMES IN VENT OF DECOMMISSIONING OF THE CLUSTER 209

CLUSTER 310

QUORUM COMMUNICATION LAYER
311

NETWORK
340

OTHER QUORUM DEVICES
330

QUORUM PROVIDING CLUSTER 320

QUORUM
VOLUME
321

QUORUM
SNAPSHOTS
322

QUORUM SNAPSHOT POLICIES
323

QUORUM SNAPSHOT RETENTION
POLICIES 324

Figure 5:
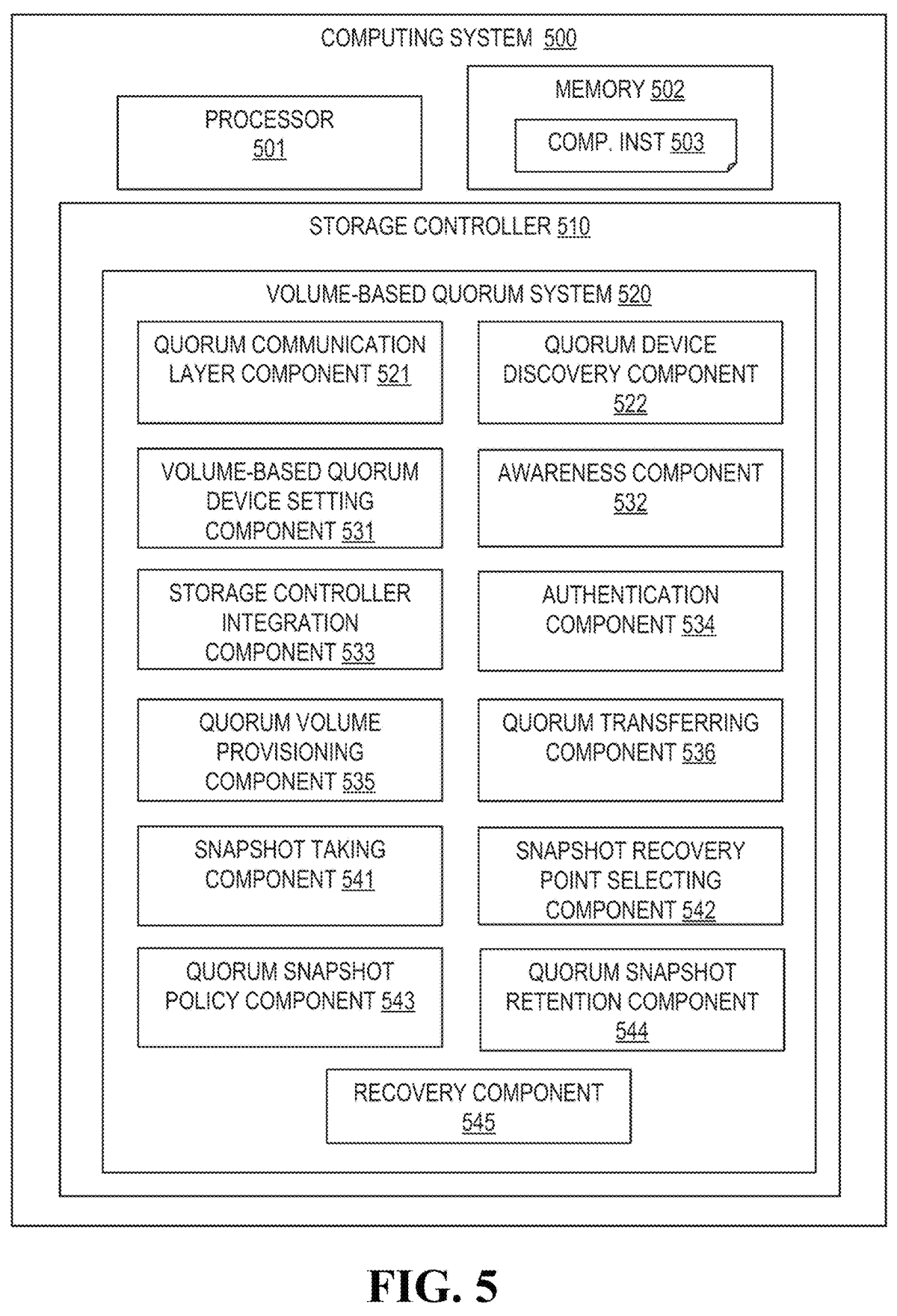

COMPUTING SYSTEM 500

PROCESSOR
501

MEMORY 502

COMP. INST 503

STORAGE CONTROLLER 510

VOLUME-BASED QUORUM SYSTEM 520

QUORUM COMMUNICATION
LAYER COMPONENT 521

QUORUM DEVICE
DISCOVERY COMPONENT
522

VOLUME-BASED QUORUM
DEVICE SETTING
COMPONENT 531

AWARENESS COMPONENT
532

STORAGE CONTROLLER
INTEGRATION
COMPONENT 533

AUTHENTICATION
COMPONENT 534

QUORUM VOLUME
PROVISIONING
COMPONENT 535

QUORUM TRANSFERRING
COMPONENT 536

SNAPSHOT TAKING
COMPONENT 541

SNAPSHOT RECOVERY
POINT SELECTING
COMPONENT 542

QUORUM SNAPSHOT
POLICY COMPONENT 543

QUORUM SNAPSHOT
RETENTION COMPONENT
544

RECOVERY COMPONENT
545

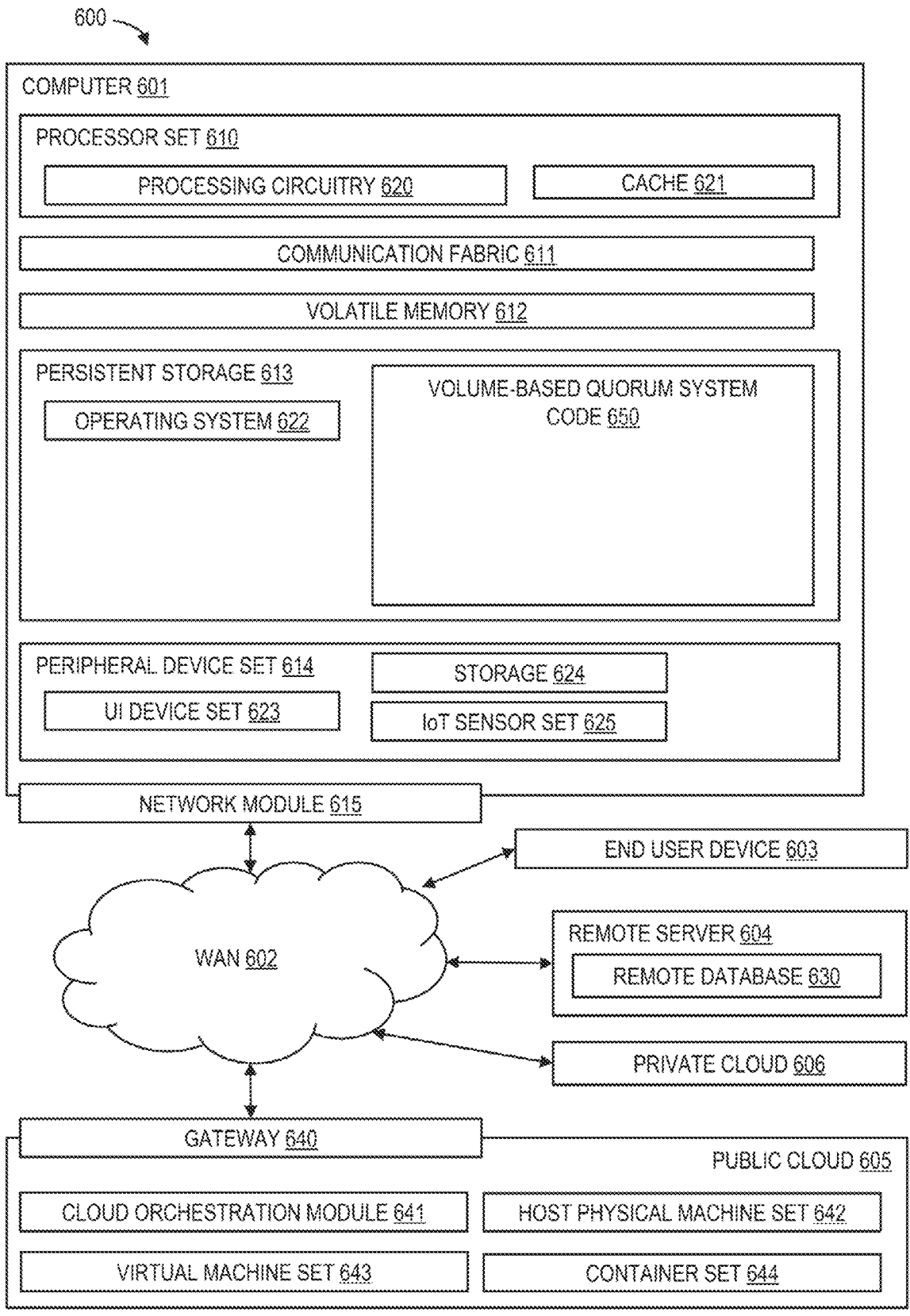

COMPUTER 601

PROCESSOR SET 610

PROCESSING CIRCUITRY 620          CACHE 621

COMMUNICATION FABRIC 611

VOLATILE MEMORY 612

PERSISTENT STORAGE 613

OPERATING SYSTEM 622

VOLUME-BASED QUORUM SYSTEM
CODE 650

PERIPHERAL DEVICE SET 614          STORAGE 624

UI DEVICE SET 623          IoT SENSOR SET 625

NETWORK MODULE 615

WAN 602

END USER DEVICE 603

REMOTE SERVER 604

REMOTE DATABASE 630

PRIVATE CLOUD 606

GATEWAY 640          PUBLIC CLOUD 605

CLOUD ORCHESTRATION MODULE 641          HOST PHYSICAL MACHINE SET 642

VIRTUAL MACHINE SET 643          CONTAINER SET 644

FIG. 6

MANAGING A QUORUM DEVICE FOR A STORAGE SYSTEM

BACKGROUND

The embodiments of the disclosure relate to storage systems, and more specifically, to managing quorum devices for a storage system.

Copy services are a collection of features which allow storage systems to have, amongst other capabilities, disaster recovery integrated into the input/output (I/O) path. This may be achieved via Remote Copy features, by transmitting data to a partner storage system. The backup site may perform an I/O operation (e.g., a read operation and/or a write operation), notifies the primary site, and the I/O operation is removed from an associated pending set. Copy services can utilize various other techniques for its desired or otherwise predetermined functionality.

A pair of nodes within a single enclosure may be referred to herein as an I/O group. When a write operation is performed to a volume, the node that processes the I/O operation may duplicate the data onto the partner node of the I/O group. After the data is protected on the partner node, the write operation to the host application is typically completed. However, the data may be physically written to the disk at a later time.

In distributed systems, a fault scenario can exist where more than one node believes they are the leader, in which case they can both accept writes, without any synchronization which can result in data loss and/or corruption. This is known as split-brain, and distributed systems rely on a mediator service to form a quorate group to avoid such conditions.

A quorum device may be used to break a tie when a storage system fault occurs, when exactly half of the nodes that were previously a member of the system are present. A quorum device may also be used to store a backup copy of important system configuration data.

It is possible for a system to split into two groups where each group contains half the original number of nodes in the system. In this case, the quorum device may determine which group of nodes should stop operating and processing I/O requests. In this tie-break situation, the first group of nodes that accesses the quorum device may be marked as the owner of the quorum device and as a result may continue to operate as the system, handling the I/O requests. If the other group of nodes cannot access the quorum device or finds that the quorum device is owned by another group of nodes, the other group of nodes may stop operating as the system and does not handle I/O requests.

A quorum device is conventionally provided by means of utilizing the Internet Protocol network and a quorum application that can be deployed on a host in an independent failure domain. Alternatively, a quorum device is conventionally provided through the Fibre Channel network by utilizing a third controller acting as the independent domain with visibility across all sites in the cluster, so it can be accessed in failure scenarios. The quorum device is traditionally a uniformed device in which the system hides some I/O and configuration data.

SUMMARY

According to an embodiment of the present disclosure a computer-implemented method is provided for managing a quorum device for a storage system having network of storage controllers of storage clusters. The method may include designating a first storage controller as a volume-based quorum device for a second storage controller. The first storage controller is aware of being designated and functions as the volume-based quorum device. The method further includes taking snapshots of cluster state metadata at known points, saving the snapshots as quorum volumes, and recovering a storage cluster from the cluster state metadata.

The method has the advantage of providing a quorum device at a storage controller and leveraging features of the storage controller such that the quorum device can take snapshots for recovery using cluster state metadata and enables controlled recovery for volumes.

According to another embodiment of the disclosure, a system for managing a quorum device for a storage system having a network of storage controllers of storage clusters is provided. The system includes a processor and a memory that includes program instructions. The program instructions are executed by the processor and cause the processor to designate a first storage controller as a volume-based quorum device for a second storage controller. The first storage controller is aware of being designated and functions as the volume-based quorum device. The program instructions are executed by the processor and cause the processor to take snapshots of cluster state metadata at known points, save the snapshots as quorum volumes, and recover a storage cluster from the cluster state metadata.

According to a further embodiment of the present disclosure a computer program product is provided. The computer program includes a computer readable storage medium that includes program instructions that when executed by a computer causes the computer to designate a first storage controller as a volume-based quorum device for a second storage controller. The first storage controller is aware of being designated and functions as the volume-based quorum device. The program instructions that when executed by a computer further causes the computer to take snapshots of cluster state metadata at known points, save the snapshots as quorum volumes, recover a storage cluster from the cluster state metadata.

BRIEF DESCRIPTION OF THE DRAWINGS

The drawings included in the present application are incorporated into, and form part of, the specification. They illustrate embodiments of the present disclosure and, along with the description, explain the principles of the disclosure. The drawings are only illustrative of certain embodiments and do not limit the disclosure.

FIG. 2 is a flow diagram of an illustrative method in accordance with one or more embodiments of the present disclosure.

FIG. 5 is a block diagram of an illustrative computing system in accordance with one or more embodiments of the present disclosure.

FIG. 6 is a block diagram of an illustrative computing environment for the execution of at least some of the program instructions involved in performing one or more embodiments of the present disclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Embodiments of the disclosure provide a method, system, and computer program product for managing quorum devices for a storage system having network of storage controllers of storage clusters. The method and system may be used for safeguarded quorum snapshotting by managing quorum devices for a network of storage controllers.

The method may use a first storage controller as a volume-based quorum device for a second storage controller. The term "volume-based" quorum device is used to define a quorum device that provisions quorum volumes at a storage controller. The volume-based quorum devices may be used for provisioning volumes having only customer data. The first storage controller is generally aware of being treated as a quorum device and may integrate storage-centric actions into a control flow of the quorum device.

The volume-based quorum device may be configured to take snapshots of cluster state metadata at known points and may save the snapshots as quorum volumes. A storage cluster may then be recovered by using the cluster state metadata in the event of a failure, such as an insider attack or catastrophic error.

The described method and system may provide configured storage controllers to host quorum devices and may safeguard and efficiently recover cluster configuration in quorum devices using quorum snapshotting.

The method and system may provide recovery of system metadata that is being checkpointed using a safeguarded snapshot on a quorum device, so that in the event of an attack or system misconfiguration that metadata can be recovered.

The managing of quorum devices in a storage system is an improvement in the technical field of computer storage generally and more particularly in the technical field of data recovery in security systems.

Figure 1A:
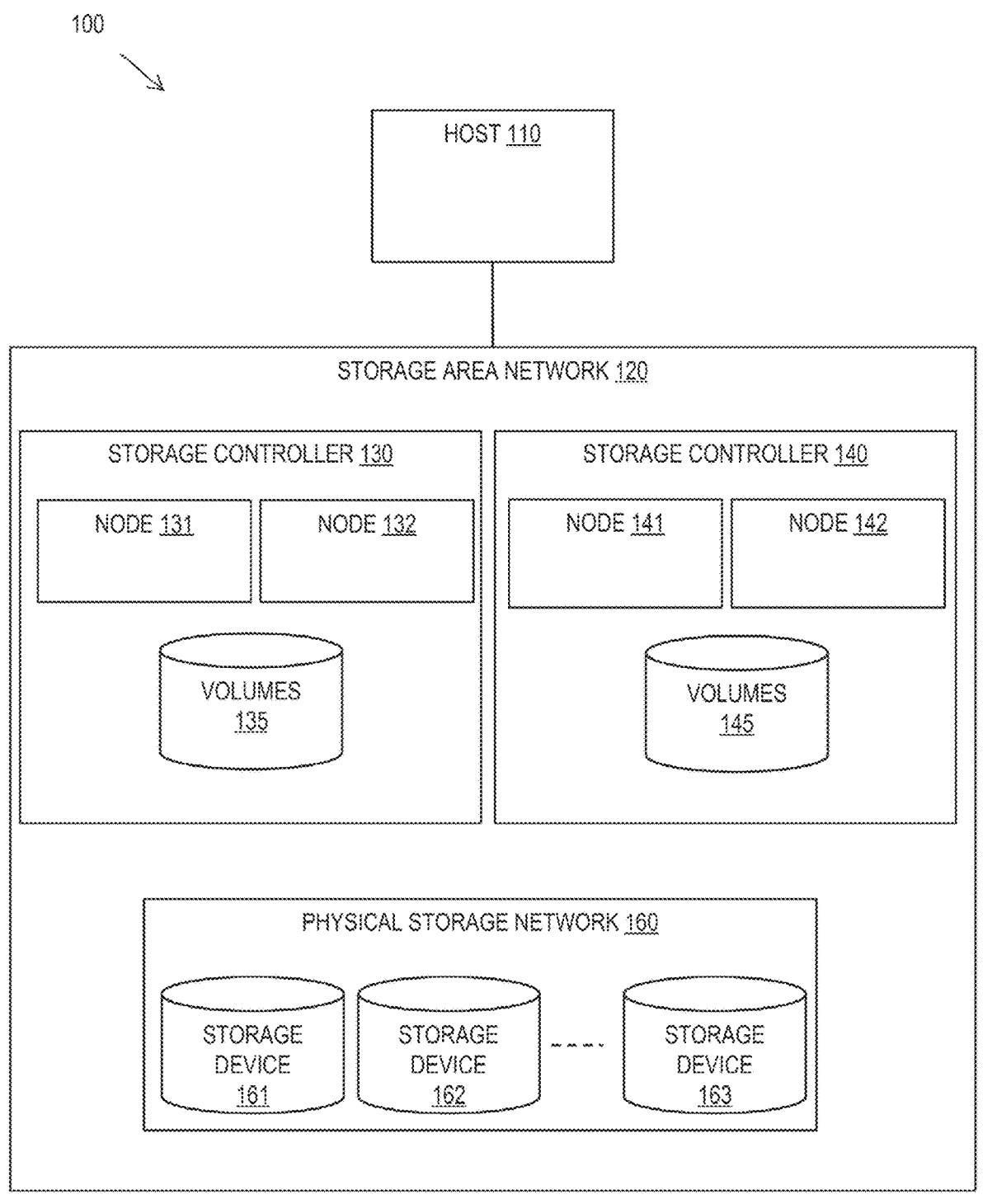
FIGS. 1A and 1B are block diagrams of illustrative storage systems in which one or more embodiments of the present disclosure may be implemented.

Referring to FIG. 1A, a block diagram shows an example embodiment of an illustrative storage system 100 in which one or more embodiments of the present disclosure may be implemented. The storage system 100 may include one or more hosts 110 or clients that access one or more volume 135, 145 provided by respective storage controllers 130, 140 in a storage area network 120. The storage controllers 130, 140 may provide clusters of multiple nodes 131, 132, 141, 142, respectively. The volumes 135, 145 may be logical drives that provide a single accessible storage area for underlying physical storage networks 160 formed of multiple physical storage devices 161-163. Multiple storage controllers 130, 140 may be used for high data availability scenarios.

It is possible to have many technologies implementing the underlying volumes 135, 145. In an example, some volumes 135, 145 may be implemented using deduplication, some may be implemented using flash-core drives, some may be implemented using conventional flash drives or nearline storage. As such, the volumes 135, 145 may be asymmetrical, or relatively different volume types.

Figure 1B:
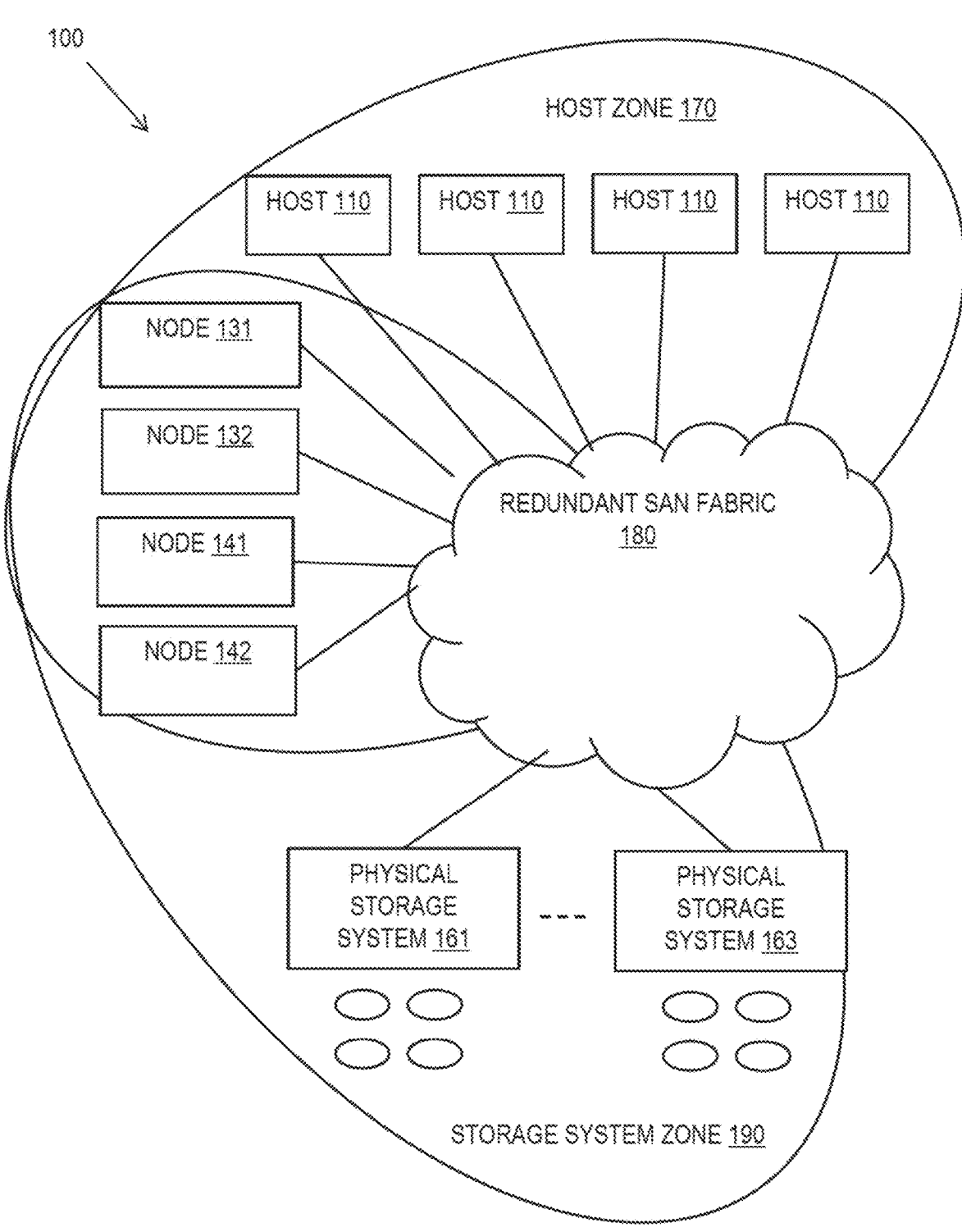

FIG. 1B illustrates flexibility and high availability of the storage system 100. Multiple hosts 110 may carry out operations on multiple nodes 131, 132, 141, 142, and may therefore provide a host zone 170 using a storage area network (SAN) fabric 180. A storage system zone 190 may be provided between the nodes 131, 132, 141, 142, and physical storage systems 161-163 connected using the storage area network fabric 180. The redundant SAN fabric comprises a fault-tolerant arrangement of two or more counterpart SANs that provide alternative paths for each SAN-attached device.

In conventional storage controllers, a quorum device provides two functions. First, a tie-breaking capability when half of the nodes cannot see the other half. Second, to keep a copy of important cluster state that is used in a recovery scenario to rebuild system and recover data and configuration of the system. These functions may be provided by the described volume-based quorum device with added functionality as described and provided by the embodiments of the present disclosure.

Referring to FIG. 2, a flow diagram shows an illustrative computer-implemented method 200 for managing quorum devices for a storage system having network of storage controllers of storage clusters.

At block 201, method 200 may include using a first storage controller as a volume-based quorum device for a second storage controller and where the first storage controller is aware of being treated as a quorum device. The first storage controller may be a remote storage controller and the second storage controller may be a local storage controller, or vice versa depending on the context.

Method 200 may make the first storage controller aware that it is hosting a quorum device for another cluster by the second storage controller sending a message over the fabric to the first storage controller to make it aware that it is now using the first storage controller as its quorum device. The first storage controller may then tag the volume-based quorum device as being in-use, for example, by changing state from free/advertised to in-use/private.

At block 202, method 200 may continue with implementing automatic discovery and selection of a volume-based quorum device on the storage system. Storage systems are discoverable on the fabric and the Internet Protocol network and a quorum device may be automatically configured.

Additional features of the first storage controller may be leveraged to allow the method 200 to take snapshots/safeguarded copies of quorum state. Therefore, method 200 may continue at block 203 with integrating storage-centric actions into a control flow of the quorum device. The storage-centric actions may include one or more of a group consisting of or comprising: volume snapshotting, safeguarded copies, and migration.

At block 204, method 200 may continue with providing authentication requirements for the first storage controller used as the quorum device to meet the authentication requirements of the second storage controller. The method 200 may also leverage security features to enable or allow operations associated with the quorum device volumes, where associated affects thereof could be potentially destructive. Such operations relating to the quorum-tagged volumes may leverage features such as two-person authentication where they could be potentially destructive.

At block 205, method 200 may continue with selecting recovery points for taking snapshots depending on the type of cluster state metadata. A user may want to recover from a very latest snapshot of the recovery checkpoint for user volumes hence allowing access to the more up-to-date copy of volume data, while at the same time an older recovery point may be desired for system configuration.

At block 206, method 200 may continue with taking snapshots of cluster state metadata at known points and may save the snapshots as quorum volumes. The cluster state metadata may be metadata associated with cluster configuration and/or metadata associated with cluster volume contents.

The illustrative method 200 may also extend the concept of snapshot policies by integrating the concept of snapshot operations before performing significant configuration actions to preserve cluster state for recovery purposes. The method 200 may leverage remotely hosted snapshots to allow recovery of the storage controller to different prior configuration states via a restore operation, for example, to recover from an insider attack.

Taking snapshots of cluster state metadata may include taking snapshots by means of creating a safeguarded copy of a quorum volume through the implementation of a safeguarded policy. A safeguarded policy is configured to trigger safeguarded copies during significant configuration actions for quorum volumes, and for other data volumes in the event that these contain data associated with the quorum device cluster. A safeguarded policy may be configured to keep more than one backup copies of the quorum state allowing a finely grained point-in-time recovery checkpoint in case network of storage controllers was to suffer catastrophic failures.

The illustrative method 200 may extend the use of safeguarded copies to backup configuration data which will allow the system to revert to a known good state after a security compromise. The method 200 may be useful in recovering the system from unintended configuration failures by a trusted user of the system which may perform an action that was not intended.

At block 207, method 200 may continue with recovering the storage cluster from the cluster state metadata in the event of a failure. At block 208, method 200 may continue with dynamically provisioning quorum volumes between the first and second storage controllers subject to failure rules. Further, at block 209, method 200 may continue with transferring quorum volumes to another cluster in the event that a quorum-providing cluster is due to be decommissioned.

Figure 3:
FIG. 3 is a block diagram illustrating an illustrative multi-cluster storage system in accordance with one or more embodiments of the present disclosure.

Referring to FIG. 3, a block diagram depicts an illustrative multi-cluster storage system 300 in accordance with one or more embodiments of the present disclosure. The multi-cluster storage system 300 may include a first cluster 310 in the form of a storage controller and multiple nodes which may include a quorum communication layer 311 for notifying configuration actions. Multi-cluster storage system 300 further may include a quorum-providing cluster 320 in the form of a storage controller and multiple nodes. The quorum-providing cluster 320 may include a quorum volume 321 and quorum snapshots 322. The quorum-providing cluster 320 may include quorum snapshot policies 323 and quorum snapshot retention policies 324. The first cluster 310 is connected to the quorum providing cluster 320 via a network 340 and may be connected to other quorum devices 330.

Figure 4A:
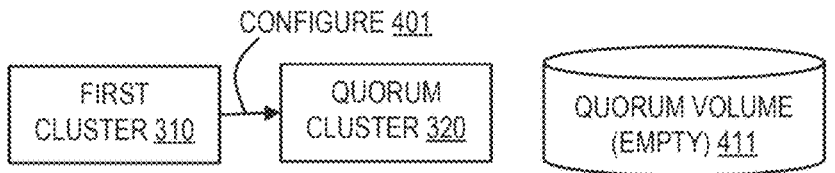
FIGS. 4A to 4D are respective schematic diagrams that illustrate an example recovery scenario using or more embodiments of the present disclosure.
Figure 4B:

FIGS. 4A to 4D show an example of a series of instances of the multi-cluster storage system 300 managing a quorum device in accordance with one or more embodiments of the disclosure using the first cluster 310 and quorum cluster 320 of FIG. 3. In FIG. 4A, the first cluster 310 configures (operation 401) a quorum cluster 320 and a quorum volume 411 is empty. In FIG. 4B, a quorum snapshot A (empty) 421 is taken before an update command 402 from the first cluster 310 notifies the quorum cluster 320 of configuration actions.

The first cluster 310 issues a command 402 to create a new storage pool (for example, "mkmdiskgrp" command) and updates the quorum volume 411 to "mdiskgrp0".

Figure 4C:
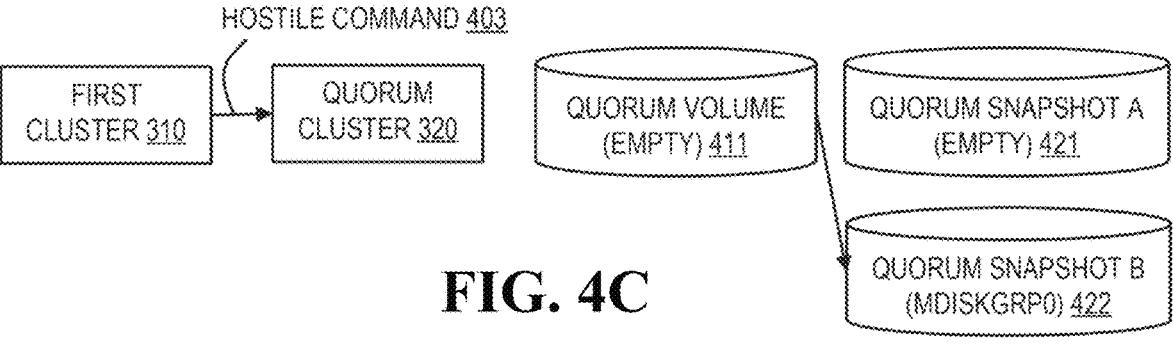

FIG. 4C shows a second quorum snapshot B (mdiskgrp0) 422 taken before a new update command as the first cluster 310 again notifies the quorum cluster 320 of configuration actions. A hostile actor via the first cluster 310 runs a hostile command 403 to the quorum cluster 320 to delete a specified storage pool (for example, "rmmdiskgrp" command) and the quorum volume 411 is emptied.

Figure 4D:
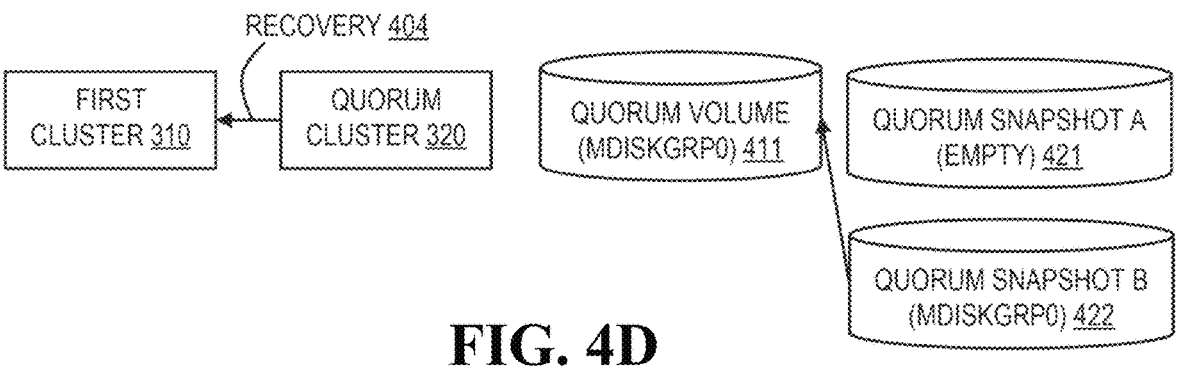

FIG. 4D shows that, as part of the recovery, the quorum snapshot B (mdiskgrp0) 422 taken before the hostile command 403 is used to restore the cluster hardened state to a good state. The quorum volume 411 is recovered to "mdiskgrp0" from quorum snapshot B 422.

The illustrative embodiments of the disclosure may provide a volume-based quorum device to act as a tiebreaker as well as to store metadata of the local system onto a remote system. In doing so, a quorum device is created that can be snapshotted by means of creating a safeguarded copy of the volume through the implementation of a safeguarded policy. The concept of safeguarded copy policies may be extended to trigger safeguarded copies during significant configuration actions for these quorum volumes, and potentially for other data volumes in the event that these contain data associated with the remote cluster. The policy may be configured to keep more than one backup copies of the quorum state, allowing a finely grained point-in-time recovery checkpoint in case the system was to suffer catastrophic failures induced by an insider attack.

A safeguarded copy of a volume cannot be tampered with and can only be removed when its expiration conditions have been met. A safeguarded copy allows a secure mechanism for data recovery; however, conventionally, it is only restricted to volumes which have user data. The illustrative embodiments of the disclosure extend the use of safeguarded copies to backup configuration data which allows the storage system to revert to a known good state after a security compromise. The illustrative embodiments of the disclosure further lend in recovering the system from unintended configuration failures by a trusted user of the system which may perform an action that was not intended.

The state that will be snapshotted on the volume-based quorum device can be categorized into two main classes. First, metadata associated to system configuration e.g., users, user groups, Network Time Protocol/Domain Name Service (NTP/DNS) server objects etc. Second, metadata associated with a logical volume (vdisk) content e.g., volume extents/grain etc. This allows flexibility in selecting a recovery point depending on the type of metadata in question. For example, a user may want to recover from a very latest snapshot of the recovery checkpoint for user volumes hence allowing access to the more up-to-date copy of logical volume data, while at the same time an older recovery point might be desired for system configuration.

The volume-based quorum device removes the need for a dedicated mediation service (as is needed in the existing IP quorum service) in a cloud configuration where several storage controllers may already have visibility of each other on the network. In the described illustrative embodiments of the disclosure, storage controllers may dynamically provision quorum volumes from one another, subject to failure domain rules. Quorum volumes may be transferred to other clusters in the event that quorum-providing clusters are due to be decommissioned, for example, through 'migrate' functionality.

The quorum providing cluster may have distinct authentication requirements to ensure that users cannot interact with the quorum cluster using the same credentials as the base cluster, and that operations relating to the quorum-tagged volumes leverage features such as two-person authentication where they could be potentially destructive.

By configuring a regular storage system as a quorum device, many features that a remote storage system has may be exploited, for example, volume migration, snapshots, safeguarded copy. When applied to a quorum device, system metadata can be recovered from a good point-in-time copy after a security incident which cuts down on the recovery time. By making use of a network connected storage system for mediation as a volume-based quorum device, a separate quorum device such as a conventional IP quorum device is not required.

The illustrative embodiments of the disclosure have advantage over conventional methods that configure multiple independent devices in different failure domains which can be costly both in terms of system resources as well as maintenance overheads. Storage controllers usually are designed for high availability whereas conventional IP quorum devices are not typically as sophisticated.

FIG. 5 shows a block diagram of a computing system 500 that which may provide and/or utilized the illustrative embodiments of the disclosure. The computing system 500 may include at least one processor 501 which may be a hardware module, or a circuit, for executing the functions of the described components which may be program instructions 503 that execute on the at least one processor. Multiple processors running parallel processing threads may be provided enabling parallel processing of some or all of the functions of the components. Memory 502 may be configured to provide program instructions 503 to the at least one processor 501 to carry out the functionality of the program instructions 503.

A storage controller 510 of a storage system may be provided on the computing system 500 and may include a volume-based quorum system 520 for managing a quorum device for the storage system that has a network of storage controllers of storage clusters. The volume-based quorum system 520 may include the following components.

A quorum communication layer component 521 may be provided on all storage controllers in the storage system to communicate with a volume-based quorum device on another storage controller. A quorum device discovery component 522 may be provided for implementing automatic discovery and selection of a volume-based quorum device on the storage system.

A volume-based quorum device setting component 531 may be provided for using the storage controller 520 as a volume-based quorum device for a second storage controller. An awareness component 532 may be provided for making the storage controller aware of being treated as a quorum device.

A storage controller integration component 533 may be provided for leveraging features of the remote storage controller and integrating storage-centric actions into a control flow of the quorum device, wherein the storage-centric actions include one or more of the group of: volume snapshotting, safeguarded copies, and migration.

An authentication component 534 may be provided for providing authentication requirements for the first storage controller used as the quorum device to meet the authentication requirements of the second storage controller.

A quorum volume provisioning component 535 may be provided for dynamically provisioning quorum volumes between the first and second storage controllers, subject to failure rules. A quorum transferring component 536 may be provided for transferring quorum volumes to another cluster in the event that a quorum-providing cluster is due to be decommissioned.

A snapshot taking component 541 may be provided for taking snapshots of cluster state metadata at known points and saving as quorum volumes.

A snapshot recovery point selecting component 542 may be provided for selecting recovery points for taking snapshots depending on the type of cluster state metadata. For example, the cluster state metadata may be metadata associated with cluster configuration and/or metadata associated with cluster volume contents.

A quorum snapshot policy component 543 may be provided for providing a policy for taking snapshots of cluster state metadata including taking snapshots by means of creating a safeguarded copy of a quorum volume through the implementation of a safeguarded policy. A quorum snapshot retention component 544 may be provided for providing a policy on the retention of the snapshots.

A recovery component 545 may be provided for recovering a storage cluster from the cluster state metadata in the event of a failure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, computer readable storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these computer readable storage mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. The computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 6, a block diagram of an illustrative computing environment 600 for the execution of at least some of the program instructions involved in performing one or more embodiments of the present disclosure is presented. The computing environment 600 may execute of at least some of the program instructions involved in performing the one or more embodiments of the present disclosure, such as volume-based quorum system code 650. In addition to volume-based quorum system code 650, computing environment 600 may include, for example, computer 601, wide area network (WAN) 602, end user device (EUD) 603, remote server 604, public cloud 605, and private cloud 606. In this example, computer 601 may include processor set 610 (including processing circuitry 620 and cache 621), communication fabric 611, volatile memory 612, persistent storage 613 (including operating system 622 and volume-based quorum system code 650, as identified above), peripheral device set 614 (including user interface (UI) device set 623, storage 624, and Internet of Things (IoT) sensor set 625), and network module 615. Remote server 604 may include remote database 630. Public cloud 605 may include gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

PROCESSOR SET 610 may include one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document. These computer readable program instructions are stored in various types of computer readable storage media, such as cache 621 and the other storage media discussed below. The program instructions, and associated data, are accessed by processor set 610 to control and direct performance of the one or more methods of the disclosure. In computing environment 600, at least some of the instructions for performing the methods of the disclosure may be stored in block 650 in persistent storage 613.

COMMUNICATION FABRIC 611 is the signal conduction path that allows the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, volatile memory 612 is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface-type operating systems that employ a kernel. The code included in block 650 typically may include at least some of the computer code involved in performing the methods of the disclosure.

PERIPHERAL DEVICE SET 614 may include the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

NETWORK MODULE 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the methods of the disclosure can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN 602 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601) and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

The descriptions of the various embodiment of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the embodiments of the present disclosure.

The invention claimed is:

1. A computer implemented method for managing a quorum device for a storage system comprising a network of storage controllers of storage clusters, the computer implemented method comprising:

designating a first storage controller as a volume-based quorum device for a second storage controller, wherein the first storage controller is aware of being designated and functions as the volume-based quorum device based on a message received by the first storage controller from the second storage controller, and wherein the message is indicative of the first storage controller being designated as the volume-based quorum device and responsive to receipt of the message, the first storage controller functions as the volume-based quorum device;

taking snapshots of cluster state metadata at known points and saving the snapshots as quorum volumes; and recovering a storage cluster from the cluster state metadata.

2. The computer implemented method of claim 1, wherein the cluster state metadata comprises cluster configuration data or cluster volume content data, and wherein the computer implemented method further comprise:

selecting recovery points for taking the snapshots depending on the cluster state metadata.

3. The computer implemented method of claim 1, further comprising:

dynamically provisioning the quorum volumes between the first and second storage controllers.

4. The computer implemented method of claim 1, further comprising:

transferring the quorum volumes to another cluster when a quorum-providing cluster is decommissioned.

5. The computer implemented method of claim 1, further comprising:

prior to designating the first storage controller as the volume-based quorum device for the second storage controller, requiring authentication for the first storage controller to be designated as the volume-based quorum device, wherein the authentication meets authentication requirements of the second storage controller.

6. The computer implemented method of claim 1, further comprising:

requiring authentication to enable operations associated with the quorum volumes.

7. The computer implemented method of claim 1, further comprising:

integrating storage-centric actions into a control flow of the volume-based quorum device, wherein the storage-centric actions include one or more of: volume snapshotting, safeguarded copies, and migration.

8. The computer implemented method of claim 1, wherein taking the snapshots of the cluster state metadata further comprises:

creating a safeguarded copy of the quorum volumes.

9. The computer implemented method of claim 8, wherein creating the safeguarded copy occurs at significant configuration actions upon the quorum volumes.

10. The computer implemented method of claim 9, wherein more than one safeguarded copy is retained and is used for a point-in-time recovery of the quorum volumes.

11. The computer implemented method of claim 1, further comprising:

automatically discovering and selecting the volume-based quorum device.

12. A system for managing a quorum device for a storage system having a network of storage controllers of storage clusters, the system comprising:

a processor and a memory that comprises program instructions, wherein the program instructions, when executed by the processor, cause the processor to:

designate a first storage controller as a volume-based quorum device for a second storage controller, wherein the first storage controller is aware of being designated and functions as the volume-based quorum device based on a message received by the first storage controller from the second storage controller, and wherein the message is indicative of the first storage controller being designated as the volume-based quorum device and responsive to receipt of the message, the first storage controller functions as the volume-based quorum device;

take snapshots of cluster state metadata at known points and save the snapshots as quorum volumes; and recover a storage cluster from the cluster state metadata.

13. The system of claim 12, wherein the cluster state metadata comprises cluster configuration data or cluster volume content data, and wherein the program instructions, when executed by the processor, further cause the processor to:

select recovery points for taking the snapshots depending on the cluster state metadata.

14. The system of claim 12, wherein the program instructions, when executed by the processor, further cause the processor to:

dynamically provision the quorum volumes between the first and second storage controllers.

15. The system of claim 12, wherein the program instructions, when executed by the processor, further cause the processor to:

transfer the quorum volumes to another cluster when a quorum-providing cluster is decommissioned.

16. The system of claim 12, wherein the program instructions, when executed by the processor, further cause the processor to:

prior to the designation of the first storage controller as the volume-based quorum device for the second storage controller, require authentication for the first storage controller to be designated as the volume-based quorum device, wherein the authentication meets authentication requirements of the second storage controller.

17. The system of claim 12, wherein the program instructions, when executed by the processor, further cause the processor to:

integrate storage-centric actions into a control flow of the volume-based quorum device, wherein the storage-centric actions include one or more of: volume snap-shotting, safeguarded copies, and migration.

18. The system of claim 12, wherein the program instructions that when executed by the processor cause the processor to take snapshots of the cluster state metadata, the instructions further cause the processor to:

create a safeguarded copy of the quorum volumes.

19. The system of claim 12, wherein the program instructions, when executed by the processor, further cause the processor to:

automatically discover and select the volume-based quorum device.

20. A computer program product comprising a computer readable storage medium comprising program instructions that when executed by a computer cause the computer to:

designate a first storage controller as a volume-based quorum device for a second storage controller, wherein the first storage controller is aware of being designated and functions as the volume-based quorum device based on a message received by the first storage controller from the second storage controller, and wherein the message is indicative of the first storage controller being designated as the volume-based quorum device and responsive to receipt of the message, the first storage controller functions as the volume-based quorum device;

take snapshots of cluster state metadata at known points and save the snapshots as quorum volumes; and recover a storage cluster from the cluster state metadata.

* * * * *